United States Patent
Matt

(10) Patent No.: US 7,854,176 B2
(45) Date of Patent: Dec. 21, 2010

(54) METHOD FOR DETERMINING THE MASS FLOW THROUGH A CORIOLIS MASS FLOWMETER

(75) Inventor: Christian Matt, Aesch (CH)

(73) Assignee: Endress + Hauser GmbH + Co. KG, Maulburg (DE)

( * ) Notice: Subject to any disclaimer, the term of this patent is extended or adjusted under 35 U.S.C. 154(b) by 246 days.

(21) Appl. No.: 11/791,281

(22) PCT Filed: Nov. 21, 2005

(86) PCT No.: PCT/EP2005/056104

§ 371 (c)(1),
(2), (4) Date: Feb. 17, 2009

(87) PCT Pub. No.: WO2006/056560

PCT Pub. Date: Jun. 1, 2006

(65) Prior Publication Data

US 2009/0211373 A1 Aug. 27, 2009

(30) Foreign Application Priority Data

Nov. 22, 2004 (DE) .................. 10 2004 056 370

(51) Int. Cl.
*G01F 1/80* (2006.01)
(52) U.S. Cl. .................... 73/861.356
(58) Field of Classification Search ................ 73/861.355–861.357
See application file for complete search history.

(56) References Cited

U.S. PATENT DOCUMENTS

| | | | | |
|---|---|---|---|---|
| 4,559,833 A | * | 12/1985 | Sipin | 73/861.355 |
| 5,804,741 A | * | 9/1998 | Freeman | 73/861.356 |
| 6,073,495 A | * | 6/2000 | Stadler | 73/861.356 |
| 6,666,573 B2 | | 12/2003 | Grassi | |
| 2003/0083830 A1 | | 5/2003 | Wheeler | |
| 2004/0025599 A1 | | 2/2004 | Matt | |

FOREIGN PATENT DOCUMENTS

| | | |
|---|---|---|
| EP | 0 300 301 A1 | 1/1989 |
| EP | 0 474 743 B1 | 2/1995 |
| EP | 0 918 980 B1 | 6/1999 |
| EP | 1 189 037 A1 | 3/2002 |
| WO | WO 2004/102128 A2 | 11/2004 |

* cited by examiner

*Primary Examiner*—Jewel Thompson
(74) *Attorney, Agent, or Firm*—Bacon & Thomas, PLLC

(57) ABSTRACT

To ascertain the mass-flow of a Coriolis mass-flow meter, an oscillation of a measuring tube is produced with the frequency f and the resulting oscillatory movement is registered at two different measuring points with two oscillation sensors. The analog sensor signals X17, X18 of the two oscillation sensors are converted into digital sensor signals S1 and S2 and further processed in a digital signal processor DSP. In the signal processor DSP, the sum signal $\Sigma$ and the difference signal $\Delta$ are formed from the two sensor signals S1 and S2. Then the sum signal is rotated by 90°. In a further method step, the shifted sum signal is multiplied with the difference signal $\Delta$. After ascertaining the amplitude of the sum signal $\Sigma$, the mass-flow is ascertained using the formula $\dot{m} \sim |\mathrm{Im}(\Delta)|/(|\Sigma|f)$. It is not necessary for the method, that the two sensor signals S1, S2 have equal amplitudes. Thus, a controlling of the analog signals X17, X18 to equal amplitudes can be omitted.

5 Claims, 3 Drawing Sheets

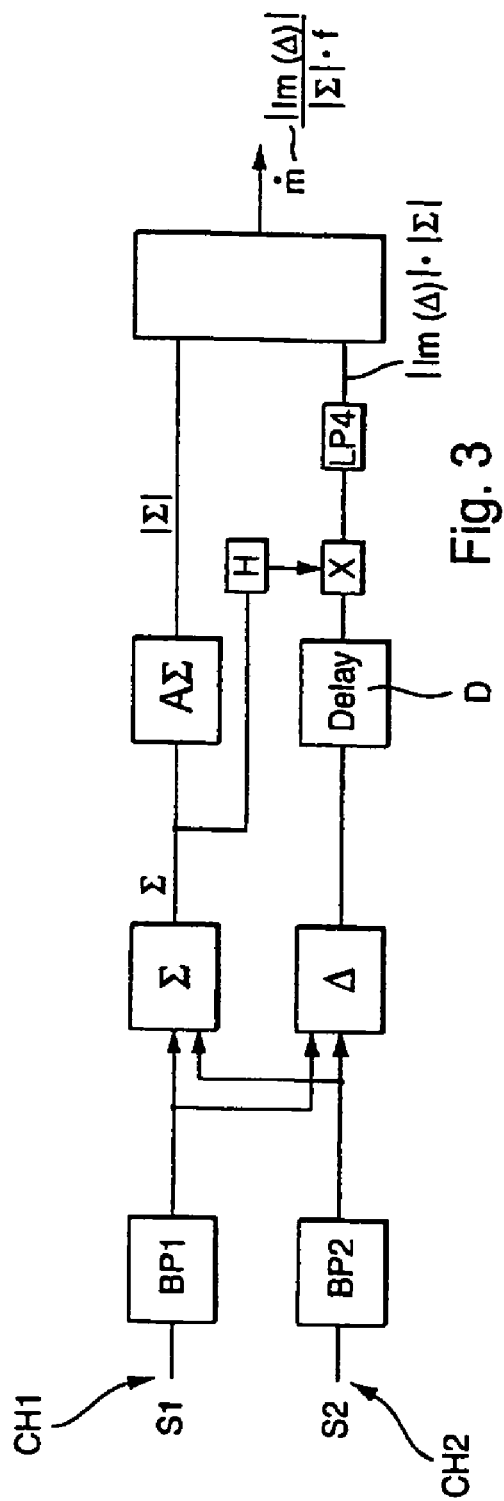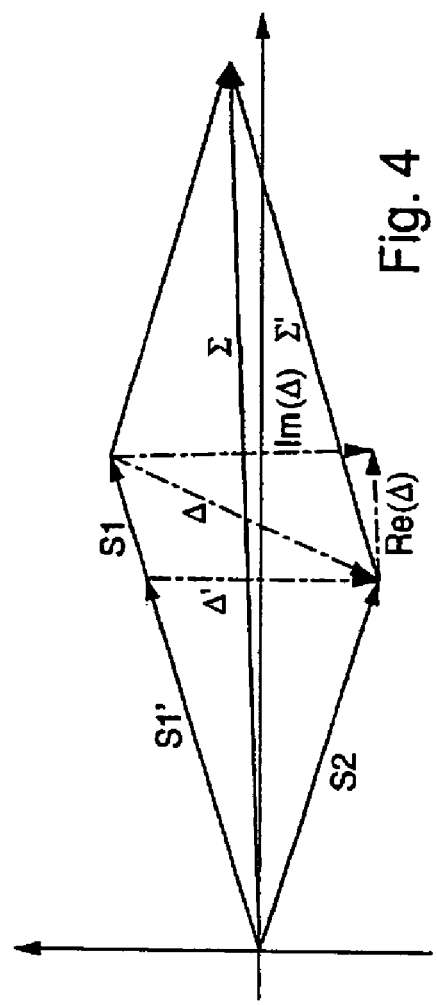

METHOD FOR DETERMINING THE MASS FLOW THROUGH A CORIOLIS MASS FLOWMETER

TECHNICAL FIELD

The invention relates to a method for determining mass-flow, e.g. mass-flow rate, using a Coriolis mass-flow meter.

BACKGROUND DISCUSSION

Coriolis mass-flow meters are used often in process measurements technology for determining mass-flow of a fluid in a section of pipeline. The Coriolis measuring principle is based on allowing the fluid to be investigated to flow through an oscillating measuring tube and evaluating the oscillatory movement. To this end, an oscillation exciter and two oscillation sensors are arranged at the measuring tube. The measuring tube with the fluid form together an oscillatable system, which is normally excited to its resonance frequency. The resonance frequency depends on, among other things, the material and dimensions of the measuring tube. Resonance frequency also depends on the density of the fluid flowing in the measuring tube.

In certain applications, the measuring tube is not excited to the resonance frequency, but, instead, to a neighboring frequency.

The two oscillation sensors register the oscillatory movement of the measuring tube at two locations spaced in the direction of flow and convert the oscillatory movements of the measuring tube into sensor signals. The two sensor signals exhibit the same frequency as the oscillatory movement of the measuring tube. If fluid is flowing through the measuring tube, then the two sensor signals are shifted in phase relative to one another. The phase shift is a measure for the mass-flow of the fluid through this section of pipeline. The sensor signals are evaluated in a measuring circuit portion, in order to determine the value of the mass-flow. This measured value can be presented in a display unit on the Coriolis mass-flow meter. As a rule, sensors, such as Coriolis mass-flow meters, which are used in automation technology, are connected with super-ordinated units, such as, for example, controllers or control systems, etc. Besides mass-flow, other properties of the fluid, such as, for example, density, can be determined. For this, a frequency evaluation of the oscillatory movement of the measuring tube is necessary.

Various types of Coriolis mass-flow meters are manufactured and sold by the firm Endress+Hauser Flowtec AG.

In the U.S. Pat. No. 4,801,897, an exciter circuit portion for a Coriolis mass-flow meter is described, which is constructed as a type of analog, phase-lag-loop control. The exciter frequency for the measuring tube tunes, in such case, automatically to the resonance frequency of the measuring tube, even in the presence of variable fluid density.

Known measuring circuits work either on an analog basis or digitally. Examples of such measuring circuits are described in greater detail in EP 698783, U.S. Pat. No. 4,895,030, EP 702212, or U.S. Pat. No. 4,529,002.

EP 698783 discloses a measuring circuit for a Coriolis mass-flow meter. Included is an analog control circuit, which controls the two sensor signals to the same amplitude. This amplitude control is of decisive importance for the measuring accuracy of the Coriolis mass-flow meter.

EP 866319 discloses another measuring and operating circuit for a Coriolis mass-flow meter. In the case of this circuit, the two sensor signals are amplified before their further processing, with the amplification factor of the amplifier being variable. In a digital signal processor, the sum and the difference of the two sensor signals are evaluated, as well as one of the sensor signals. Also here, it is essential for the measuring accuracy that the two sensor signals have, following their amplification, the same amplitude.

The amplifiers and pre amplifiers used for the analog amplification of the sensor signals must have a sufficient bandwidth, in order to prevent corruptions of the sensor signals. Due to disturbance signals, however, over-driving of the amplifiers can occur. Such over-driving acts negatively as regards accuracy of measurement. The higher the requirements for accuracy placed on the Coriolis mass-flow meter, the more complex the analog amplifiers have to be, this being reflected in increased price for the amplifiers.

Especially in the case of gas applications, relatively high flow velocities of the fluid occur. Typical values are 50-100 m/s. These high flow velocities mean a relatively high sound level in the measuring tube, which can cause significant disturbance signals.

SUMMARY OF THE INVENTION

An object of the invention is, therefore, to provide a method for determining mass-flow using a Coriolis mass-flow meter, which does not have the above mentioned disadvantages, which places especially small demands on the analog amplifier, and which requires no complex symmetry control of the two sensor signals.

This object is achieved by producing a measuring tube oscillation of frequency f; registering the oscillatory movement of the measuring tube at two different measuring points with two oscillation sensors; converting the analog sensor signals of the two oscillation sensors into digital sensor signals, wherein the two sensor signals do not necessarily have equal amplitudes and no controlling to equal amplitudes is done; forming sum signal $\Sigma$ and difference signal $\Delta$ from the two sensor signals; rotating the sum signal by 90°; multiplying the shifted sum signal by the difference signal $\Delta$; ascertaining amplitude of the sum signal $\Sigma$; and ascertaining the mass-flow $\dot{m} \sim |Im(\Delta)|/(|\Sigma| f)$.

An essential idea of the invention is to convert the two analog sensor signals to digital signals immediately after the pre amplification and to perform further evaluation of the measuring signals exclusively digitally.

BRIEF DESCRIPTION OF THE DRAWINGS

The invention will now be explained in greater detail on the basis of an example of an embodiment presented in the drawing, the figures of which show as follows:

FIG. 3 block diagram of the method of the invention; and

FIG. 4 phasor diagram for two sensor signals of a Coriolis mass-flow meter.

DETAILED DISCUSSION

Figure 1:
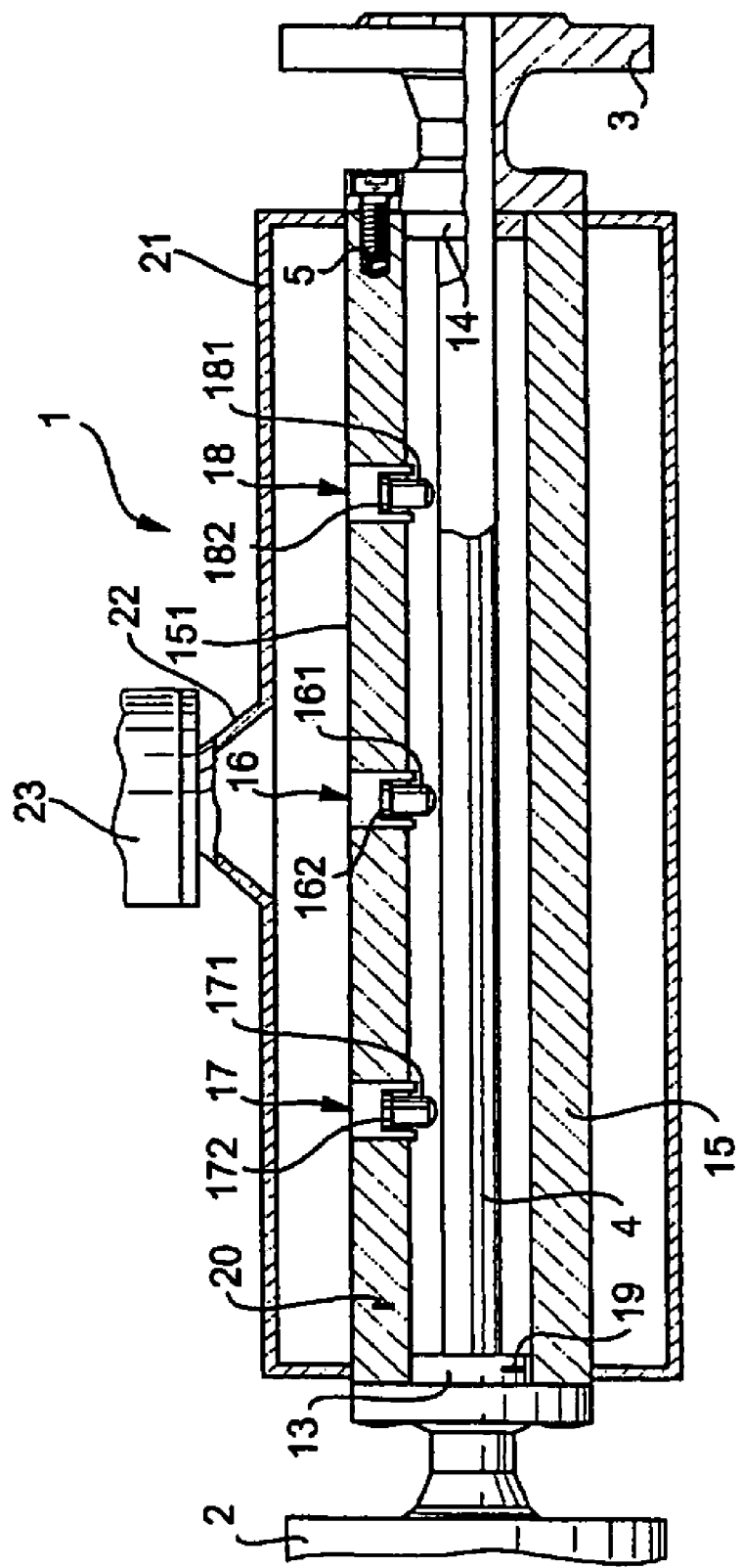
FIG. 1 a schematic drawing of a measuring transducer of a Coriolis mass-flow meter.

FIG. 1 shows, schematically, a measuring transducer 1 for a Coriolis mass-flow meter. Measuring transducer 1 is arranged in a pipeline (not shown), in which a fluid F is flowing, whose mass-flow is one of the variables of interest. Connection with the pipeline is accomplished via the two flanges 2, 3.

Measuring transducer 1 has a single, straight, measuring tube 4, which is affixed to flange 2 on the inlet side via an end plate 13 and to flange 3 on the outlet side via an end plate 14.

The measuring and operating circuit of the invention is not limited to this special measuring transducer 1 having a single, straight, measuring tube. Thus, it can be used in connection with any of the various known measuring transducers. To be mentioned are e.g. measuring transducers having a measuring tube equipped with outlier masses, such as described e.g. in EP 97 81 0559, measuring transducers having a curved measuring tube (EP 96 10 9242), as well as measuring transducers having two parallel, straight or curved, measuring tubes (U.S. Pat. Nos. 4,793,191 or 4,127,028).

The flanges 2, 3 and the end plates are secured to, or in, a support tube 15.

For producing the measuring tube oscillation, an oscillation exciter 16 is arranged on the measuring tube 4, in the middle, between the two end plates 13, 14. Oscillation exciter 16 can be e.g. an electromagnetic drive composed of a permanent magnet 161 and a coil 162.

Coil 162 is affixed to the support tube 15 and the permanent magnet 161 is affixed to the measuring tube 4.

Via the current flowing in the coil 162, the amplitude and frequency of the bending oscillation of the measuring tube 4, which occurs in the plane of the drawing, can be controlled.

Also arising in the plane of the drawing are the Coriolis forces, which effect that all points along the measuring tube 4 no longer oscillate in phase.

The oscillatory movement of the measuring tube 4 is registered with the help of two oscillation sensors 17, 18, which are arranged likewise on the support tube 15 essentially symmetrically about the oscillation exciter 16. The oscillation sensors 17, 18 can be e.g. electromagnetic transducers, which are constructed similarly to the mentioned permanent magnet and coil of the oscillation exciter 16.

The two permanent magnets 171, 181 are affixed to the measuring tube 4 and the two coils 172, 182 are affixed to the support tube 15. The movement of the measuring tube 4 induces, via the magnets 171, 181, voltages in the respective coils 172, 182, and these voltages are tapped as the analog sensor signals X17, X18.

A Coriolis mass-flow meter is composed, as a rule, of a measuring transducer and an associated measuring and operating circuit.

Figure 2:
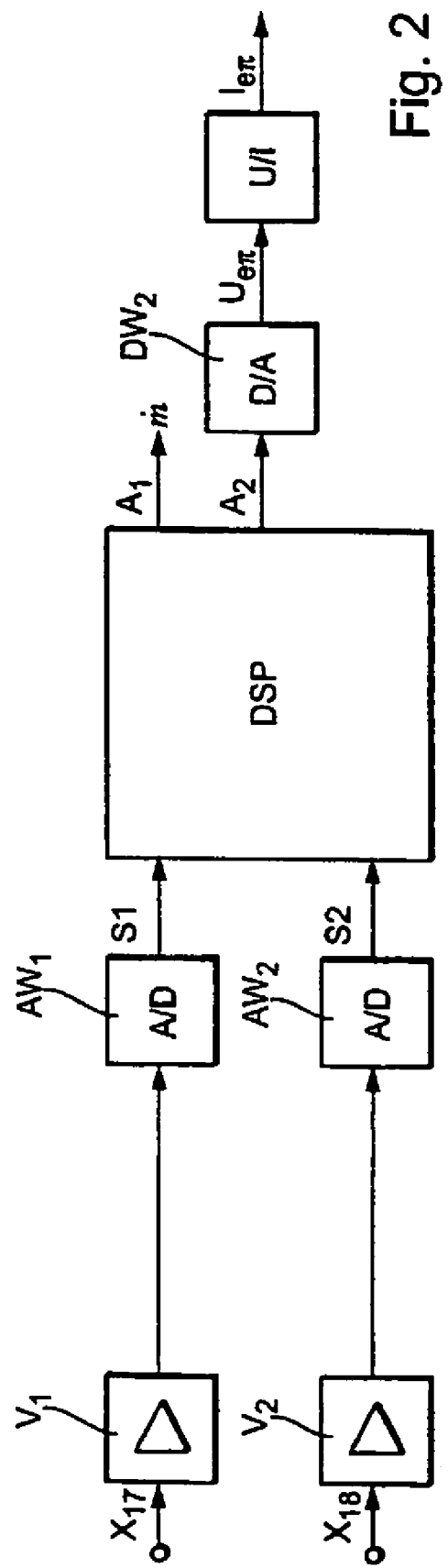
FIG. 2 block diagram of a measuring and operating circuit of a Coriolis mass-flow meter.

FIG. 2 shows a block diagram of such a measuring and operating circuit belonging to the measuring transducer 1. Among other things, this circuit performs the evaluation of the two sensor signals and controls the exciting of the measuring tube 4 to oscillate.

The two sensor signals X17 and X18, which are registered by the oscillation sensors 17, 18, are amplified in the two pre-amplifiers V1 and V2 and digitized in analog/digital converters AW1, AW2, respectively, to provide two digital sensor signals S1, S2, which are fed to a digital signal processor DSP. The digital signal processor DSP delivers to a first output A1 the measured value $\dot{m}$ of the mass-flow. An output A2 delivers a signal, which controls the exciter current $I_{ex}$ for the oscillation excitement of the measuring tube.

FIG. 3 shows in schematic representation the individual method steps, which are performed in the digital signal processor DSP for ascertaining the mass-flow $\dot{m}$.

The two digital sensor signals S1, S2 are band-limited on channels CH1, CH2, respectively, with the help of anti-aliasing filters BP1, BP2, and are fed to a summing element Σ and to a difference element Δ.

From the sum signal Σ, which is available after the summing element Σ, on the one hand, the amplitude |Σ| is formed in a stage AΣ. The sum signal Σ is, on the other hand, subjected to a Hilbert transformation in a Hilbert element H and multiplied with the difference signal Δ delayed in a delay element D. The delay element D is necessary, since, in a digital time-discrete signal processing in a Hilbert transformer, a delay is caused. This is apparent on the basis of the z-representation describing the behavior of the Hilbert transformer.

By filtering with a lowpass filter LP4, the product of the sum signal |Σ| and the component |Im(Δ)| stemming from the mass-flow is obtained.

In the next method step, the mass-flow $\dot{m}$ is ascertained from the formula $\dot{m} \sim |Im(\Delta)|/(|\Sigma|*f)$. The f stands for the frequency of the measuring tube oscillation.

The measured value $\dot{m}$ can be further processed in an evaluating circuit (not shown) or displayed in a display (likewise not shown). Also, a forwarding of the measured value $\dot{m}$ to a superordinated unit (controller, control system) is another option.

FIG. 4 shows the relationship between the two sensor signals S1 and S2 on the basis of a usual phasor diagram. The two sensor signals are shown as vectors and exhibit different magnitudes due to the unequal amplitudes of the sensor signals. In the phasor diagram, the phase shift between the sensor signals S1, S2 caused by the Coriolis effect is clearly visible.

Σ stands for the sum signal and Δ for the difference signal of the two sensor signals.

Also drawn is the case wherein the two sensor signals (S2 and S1') have the same amplitude.

Σ' stands for the sum signal and Δ' for the difference signal of the two sensor signals S1' and S2.

As apparent from FIG. 4, the magnitude of the sum signal |Σ'| is proportional to the magnitude of the sum signal |Σ|. Moreover, the magnitude of the component |Im(Δ)| of the difference signal perpendicular to the sum signal Σ is proportional to the magnitude of the difference signal |Δ'|. Re(Δ) stands for the component of the difference signal Δ in-phase with the sum signal Σ. By rotating the sum signal Σ by 90° and scalar multiplication with the difference signal Δ, one obtains exactly this portion |Im(Δ')| multiplied by the magnitude |Σ| of the sum signal.

The asymmetry of the signals S1 and S2, i.e. their unequal amplitudes, is reflected in the measurement result, the mass-flow $\dot{m}$, only in a proportionality factor. So long as the asymmetry does not change, also this proportionality factor does not change. The constant proportionality factor can, however, be taken into consideration in the calibration factor for the Coriolis mass-flow meter. Each Coriolis mass-flow meter must be calibrated, in order to be able to output an exact measured value.

The invention claimed is:

1. A method for ascertaining the mass-flow of a Coriolis mass-flow meter, comprising the steps of: producing a measuring tube oscillation of frequency f;
   registering the oscillatory movement of the measuring tube at two different measuring points with two oscillation sensors;
   converting the analog sensor signals of the two oscillation sensors into digital sensor signals, wherein the two sensor signals do not necessarily have equal amplitudes and no controlling to equal amplitudes is done;
   forming sum signal Σ and difference signal Δ from the two sensor signals; rotating the sum signal by 90°;
   multiplying the shifted sum signal by the difference signal Δ;
   ascertaining amplitude of the sum signal Σ; and
   ascertaining the mass-flow $\dot{m} \sim |Im(\Delta)|/(|\Sigma|f)$.

2. The method as claimed in claim 1, wherein:
the rotating of the sum signal $\Sigma$ is done with aid of a Hilbert transformer.

3. The method as claimed in claim 1, wherein:
the two sensor signals are filtered in bandpass filters, respectively, before further processing.

4. The method as claimed in claim 1, wherein:
the two sensor signals are pre amplified before digitizing.

5. An apparatus for performing the method claimed in claim 1.

* * * * *